United States Patent

[11] 3,548,884

| [72] | Inventor | John Ambrose<br>New Waltham, Grimsby, England |
| --- | --- | --- |
| [21] | Appl. No. | 796,824 |
| [22] | Filed | Feb. 5, 1969 |
| [45] | Patented | Dec. 22, 1970 |
| [73] | Assignee | The Dunlop Company Limited<br>London,<br>a British company |
| [32] | Priority | Feb. 7, 1968 |
| [33] | | Great Britain |
| [31] | | No. 6011/68 |

[54] HOSE
13 Claims, 1 Drawing Fig.
[52] U.S. Cl. ................................................. 138/144,
138/149, 138/153
[51] Int. Cl. ..................................................... F16l 9/16
[50] Field of Search ........................................ 138/144,
149, 153, 178

[56] References Cited
UNITED STATES PATENTS

| 3,119,415 | 1/1964 | Galloway et al. | 138/149X |
| --- | --- | --- | --- |
| 3,130,753 | 4/1964 | Monnen | 138/178X |
| 3,155,117 | 11/1964 | Spillmann | 138/149 |
| 3,425,455 | 2/1969 | Kilpert et al. | 138/149X |

*Primary Examiner*—Louis K. Rimrodt
*Attorney*—Stevens, Davis, Miller & Mosher

ABSTRACT: A buoyant hose for the offshore loading and discharge of oil. The hose is reinforced against expansion by an inner structure of high-tensile steel wire wound helically and coaxially, with respect to the axis of the hose, around an inner lining. A second helical and coaxial reinforcing structure of glass fibre/resin strip of greater diameter than the first reinforcing structure is also incorporated in the hose to resist any substantial charge in the volume displacement of the hose due to the effects of water pressure and crush loads. A layer of closed cell expanded rubber sponge is disposed between the two reinforcing structures.

PATENTED DEC 22 1970
3,548,884
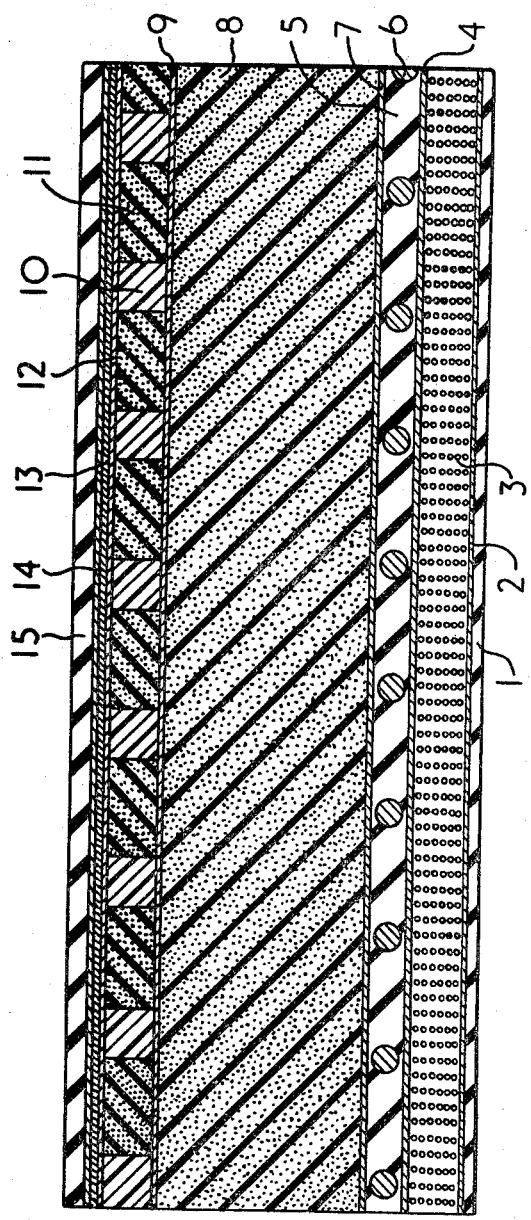
INVENTOR
JOHN AMBROSE
By Stevens, Davis, Miller & Mosher
ATTORNEYS

HOSE

This invention relates to hose, and particularly but not exclusively to hose for the offshore loading and discharge of oil.

One object of the present invention is to provide a buoyant hose of low weight and bulk and suitable for use underwater as a connection between a terminal buoy and the end of a steel underwater pipe line.

According to the invention, a hose comprises a lining of elastomeric material surrounded by a first reinforcing structure arranged coaxially with respect to the hose to resist expansion of the lining, a second reinforcing structure of greater diameter than the first reinforcing structure arranged coaxially with respect to the hose to resist any substantial change in the volume displacement of the hose due to the effects of external water pressure or crush loads applied to the hose, a layer of cellular material disposed between the first and second reinforcing structures, and an impervious outer covering.

The first reinforcing structure may be in the form of a high-tensile steel wire wound helically and coaxially around a cord-reinforced inner lining of the hose, and the second reinforcing structure may be in the form of a helical winding or axially-spaced rings of a glass fibre/resin material.

Where the second reinforcing structure is of glass fibre/resin material, this may be preformed before assembly on to the hose, but in a preferred method in accordance with the invention the glass fibre/resin material is applied in an uncured state.

One embodiment of the invention will now be described with reference to the accompanying drawing which shows an axial cross-sectional view of the hose wall.

A submarine hose which is intended to form the connection between a terminal buoy and the outer end of a steel underwater pipe line from the shore is required to be sufficiently buoyant to prevent the hose from dragging on the sea bed where it may suffer damage. A hose for this purpose is constructed as follows: the hose, which is of 20 inches internal diameter is built up by preparing on a mandrel a lining 1 of nitrile rubber around which is wrapped a "breaker" layer 2 of one ply leno weave fabric coated with a suitable polymer compound. Around the outer surface of the breaker layer six layers 3 of parallel-cord polypropylene cord fabric coated with a suitable low-density polymer compound are then laid in superimposed relationship with the cords lying helically at a bias angle of approximately 56° to the axial direction of the inner lining 1, the cords in successive layers lying at opposite bias angles. Around the outer surface of the polypropylene cord layers a second fabric breaker layer 4 is added.

A layer of uncured rubber compound 5 is then laid around the partly-built assembly, and a high-tensile steel wire 6 is wound helically around the assembly so that it becomes embedded in the uncured rubber compound. The cross-sectional diameter of the steel wire 6 is 0.25 of an inch and it is laid in a helix with a pitch of 1¼ inches between turns. A breaker layer 7 of rubberised leno weave fabric as described above is then applied, and the assembly is wrapped with nylon cloths and vulcanized.

After curing the nylon cloths are removed and the outer surface is coated with adhesive. A filling of closed-cell expanded rubber sponge 8 is then applied in two layers to give a total thickness of 1½ inches. A thin rubber layer 9 is then wrapped around the outer surface of the foam layers.

A helical winding 10 of square-section rod formed from a glass fibre/resin composition is then applied to the partly-built assembly, the rod being uncured before assembly but containing a curing agent so that it is cured in situ. The rod is ½ inch square in size and applied in a helix the axis of which is coaxial with respect to the hose and having a pitch of 1½ inches. The space between the turns of the helix is filled with a winding of closed-cell expanded rubber sponge 11, the radially inner and outer surfaces of the sponge being provided with layers of rubber compound containing a blowing agent for consolidation during the final curing process.

A rubber covering layer 12 is then wrapped around the glass fibre/resin and rubber sponge windings, and two plies of bias-cut rubberised parallel-cord polypropylene cord fabric 13 are applied, followed by a one-ply leno weave rubberised fabric breaker layer 14 and an outer covering of neoprene rubber 15. The completed assembly is then wrapped with nylon cloth and placed in a steam vulcaniser to cure the outer layers.

The submarine hose manufactured as described above has the advantage that is remains buoyant even when subjected to hydrostatic pressure at depths of 100 feet or more, the glass fibre/resin rod winding 10 serving to prevent the inner sponge rubber layers from being compressed by the hydrostatic pressure. An alternative to the use of a continuous helical winding of the glass fibre/resin rod would be to employ glass fibre/resin rod formed into a series of separate rings spaced, for example, at 1 inch intervals along the length of the hose.

In the embodiment described above the inner reinforcement layers comprise polypropylene cords 3, which have the advantage of providing exceptionally high buoyancy. However, for certain applications in which maximum buoyancy is not required cords of other materials, such as steel or polyester cords may be used.

While in the embodiment described above the inner lining 1 is made from nitrile rubber, any other oil resistant rubber lining, such as neoprene, could be provided.

One advantage of employing the method described above to form the second reinforcing structure from uncured glass fibre/resin material is that it overcomes a problem which arises in certain cases where the diameter of the coupling flanges of the hose is relatively large, making it impossible to pass a rigid preformed helix or series of loops over the flanges during assembly of the hose.

I claim:

1. A hose comprising a lining of elastomeric material surrounded by a first reinforcing structure arranged coaxially with respect to the hose to resist expansion of the lining, a second reinforcing structure of greater diameter than the first reinforcing structure arranged coaxially with respect to the hose to resist any substantial change in the volume displacement of the hose due to the effects of external water pressure or crush loads applied to the hose, a layer of cellular material being disposed between the first and second reinforcing structures, and an impervious outer covering.

2. A hose according to claim 1 in which the second reinforcing structure comprises a helical winding of glass fibre/resin material the axis of the helical winding being coaxial with respect to the hose.

3. A hose according to claim 1 in which the second reinforcing structure comprises a series of separate spaced rings of glass fibre/resin material coaxial with respect to the hose.

4. A hose according to claim 2 in which the glass fibre/resin helix or rings are constructed from square cross section strip.

5. A hose according to claim 3 in which the glass fibre/resin rings are constructed from square cross section strip.

6. A hose according to claim 1 wherein the cellular material between the reinforcing structures comprises closed cell expanded rubber sponge.

7. A hose according to claim 1 in which the first reinforcing structure comprises a helical winding of high-tensile steel wire.

8. A hose according to claim 7 in which the helical winding of high-tensile steel is embedded in a layer of uncured rubber compound.

9. A hose according to claim 1 comprising an additional inner reinforcement of polypropylene cord.

10. A hose according to claim 1 comprising an additional inner reinforcement of polyester cords.

11. A hose according to claim 1 comprising an additional inner reinforcement of steel cords.

12. A hose according to claim 1 comprising an inner lining of oil-resistant rubber.

13. A hose according to claim 1 comprising a neoprene rubber outer covering.